US010721651B2

(12) United States Patent
Mittal et al.

(10) Patent No.: US 10,721,651 B2
(45) Date of Patent: Jul. 21, 2020

(54) METHOD AND SYSTEM FOR STEERING BIDIRECTIONAL NETWORK TRAFFIC TO A SAME SERVICE DEVICE

(71) Applicant: Arista Networks, Inc., Santa Clara, CA (US)

(72) Inventors: Anuraag Mittal, Santa Clara, CA (US); Aparna Sushrut Karanjkar, Santa Clara, CA (US); Nitin Ravindra Karkhanis, Santa Clara, CA (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 15/721,505

(22) Filed: Sep. 29, 2017

(65) Prior Publication Data

US 2019/0104438 A1 Apr. 4, 2019

(51) Int. Cl.
| | |
|---|---|
| *H04W 28/08* | (2009.01) |
| *H04W 40/24* | (2009.01) |
| *H04W 99/00* | (2009.01) |
| *H04W 48/18* | (2009.01) |
| *H04W 76/10* | (2018.01) |
| *H04L 12/743* | (2013.01) |

(Continued)

(52) U.S. Cl.
CPC ......... *H04W 28/08* (2013.01); *H04L 45/7453* (2013.01); *H04W 40/24* (2013.01); *H04W 48/18* (2013.01); *H04W 76/10* (2018.02); *H04W 99/00* (2013.01); *H04L 45/66* (2013.01); *H04L 49/354* (2013.01)

(58) Field of Classification Search
CPC ..... H04W 28/08; H04W 76/10; H04W 48/18; H04W 99/00; H04W 40/24

USPC ......................................... 370/351, 315, 235
See application file for complete search history.

(56) References Cited

U.S. PATENT DOCUMENTS

| | | |
|---|---|---|
| 8,477,715 B2 | 7/2013 | Bahini et al. |
| 8,811,409 B2 | 8/2014 | Allan |
| 8,948,054 B2 | 2/2015 | Kreeger et al. |

(Continued)

FOREIGN PATENT DOCUMENTS

EP 2182694 A1 5/2010

OTHER PUBLICATIONS

International Search Report issued in corresponding Application No. PCT/US2019/049134, dated Oct. 30, 2019.

(Continued)

*Primary Examiner* — Kwang B Yao
*Assistant Examiner* — Syed M Bokhari
(74) *Attorney, Agent, or Firm* — Chamberlain, Hrdlicka, White, Williams & Aughtry

(57) ABSTRACT

A method and system for steering bidirectional network traffic to a same service device. Specifically, the disclosed method and system entail the maintaining and synchronization of link aggregation group (LAG) tables tied to a pair of LAG ports instantiated on a network element directly connected to a pair of peer linking service devices. Network traffic (i.e., MAC frames) arriving at the network element, from a first host and intended for a second host (e.g., indicative of a first direction of the network traffic), may be steered towards one of the pair of service devices based on hashing of information included in a received MAC frame in conjunction with the LAG table tied to the LAG port (of the pair of LAG ports) that which received the MAC frame.

20 Claims, 10 Drawing Sheets

(51) Int. Cl.
*H04L 12/931* (2013.01)
*H04L 12/721* (2013.01)

(56) References Cited

U.S. PATENT DOCUMENTS

| | | |
|---|---|---|
| 9,143,400 B1 | 9/2015 | Roskind et al. |
| 9,204,345 B1 | 12/2015 | Roskind |
| 9,462,502 B2 | 10/2016 | Kim et al. |
| 9,509,603 B2 | 11/2016 | Duda et al. |
| 9,596,099 B2 | 3/2017 | Yang et al. |
| 9,621,508 B2 | 4/2017 | Duda |
| 9,654,300 B2 | 5/2017 | Pani |
| 9,654,409 B2 | 5/2017 | Yadav et al. |
| 10,187,302 B2 | 1/2019 | Chu et al. |
| 10,298,538 B2 | 5/2019 | Yang et al. |
| 2006/0002324 A1 | 1/2006 | Babbar et al. |
| 2008/0019319 A1 | 1/2008 | Bahini et al. |
| 2008/0205377 A1 | 8/2008 | Chao et al. |
| 2014/0006706 A1* | 1/2014 | Wang ............... G06F 16/90339 711/108 |
| 2014/0064091 A1* | 3/2014 | Basso .................. H04L 45/742 370/235.1 |
| 2014/0112122 A1 | 4/2014 | Kapadia et al. |
| 2014/0198647 A1* | 7/2014 | Chowdhury .......... H04L 47/125 370/235 |
| 2015/0023352 A1 | 1/2015 | Yang et al. |
| 2015/0058470 A1 | 2/2015 | Duda |
| 2015/0098359 A1 | 4/2015 | Yen et al. |
| 2015/0103679 A1 | 4/2015 | Tessmer et al. |
| 2015/0124586 A1 | 5/2015 | Pani |
| 2015/0149657 A1 | 5/2015 | Reddy et al. |
| 2015/0381495 A1 | 12/2015 | Cherian et al. |
| 2016/0014241 A1 | 1/2016 | Tai |
| 2016/0036703 A1 | 2/2016 | Josyula |
| 2016/0080247 A1 | 3/2016 | Yang et al. |
| 2016/0156560 A1* | 6/2016 | Yasuda ............... H04L 12/4633 370/315 |
| 2016/0173529 A1 | 6/2016 | Baig et al. |
| 2016/0182382 A1 | 6/2016 | Singaravelu et al. |
| 2016/0277497 A1 | 9/2016 | Bannister et al. |
| 2016/0330046 A1 | 11/2016 | Yang et al. |
| 2016/0381015 A1 | 12/2016 | Ravinutala et al. |
| 2017/0093758 A1 | 3/2017 | Chanda |
| 2017/0099182 A1 | 4/2017 | DeBolle et al. |
| 2017/0214549 A1 | 7/2017 | Yoshino et al. |
| 2017/0289031 A1 | 10/2017 | Duda |
| 2017/0308828 A1 | 10/2017 | Viquez Calderon |
| 2017/0346736 A1 | 11/2017 | Chander et al. |
| 2018/0123827 A1 | 5/2018 | Josyula |
| 2018/0139098 A1 | 5/2018 | Sunavala et al. |
| 2019/0028424 A1 | 1/2019 | Mittal et al. |
| 2019/0173888 A1 | 6/2019 | Li et al. |
| 2019/0215175 A1 | 7/2019 | Mathew et al. |

OTHER PUBLICATIONS

Written Opinion issued in corresponding Application No. PCT/US2019/049134, dated Oct. 30, 2019.

* cited by examiner

METHOD AND SYSTEM FOR STEERING BIDIRECTIONAL NETWORK TRAFFIC TO A SAME SERVICE DEVICE

BACKGROUND

Stateful service devices, which are deployed redundantly in a network, expect to see bidirectional network traffic between any given pair of end points. Current deployment configurations require a set of dedicated links between service devices to carry network traffic between the service devices based on where the session state resides.

SUMMARY

In general, in one aspect, embodiments of the invention relate to a method for handling media access control (MAC) frames. The method includes obtaining, by a network element, a first MAC frame originating from a first host and addressed to a second host, processing the first MAC frame to obtain a first virtual local area network (VLAN) tag, identifying, using the first VLAN tag, a first link aggregation group (LAG) port comprising a first plurality of network interfaces, deriving a first hash key using at least a portion of the first MAC frame, identifying, using the first hash key, a first network interface of the network element, wherein the first plurality of network interfaces comprises the first network interface, and bridging, using the first network interface, the first MAC frame to a first service device of a pair of service devices directly connected to the network element.

In general, in one aspect, embodiments of the invention relate to a system. The system includes a plurality of hosts, a network element operatively connected to the plurality of hosts, and comprising a processor and a first plurality of network interfaces, and a pair of service devices directly connected to the network element. Further, the processor is programmed to obtain a first media access control (MAC) frame originating from a first host and addressed to a second host of the plurality of hosts, process the first MAC frame to obtain a first virtual local area network (VLAN) tag, identify, using the first VLAN tag, a first link aggregation group (LAG) port comprising a second plurality of network interfaces, wherein the second plurality of network interfaces is a subset of the first plurality of network interfaces, derive a first hash key using at least a portion of the first MAC frame, identify, using the first hash key, a first network interface of the network element, wherein the second plurality of network interfaces comprises the first network interface, and bridge, using the first network interface, the first MAC frame to a first service device of the pair of service devices.

In general, in one aspect, embodiments of the invention relate to a non-transitory computer readable medium (CRM) comprising computer readable program code, which when executed by a computer processor, enables the computer processor to obtain, by a network element, a first media access control (MAC) frame originating from a first host and addressed to a second host, process the first MAC frame to obtain a first virtual local area network (VLAN) tag, identify, using the first VLAN tag, a first link aggregation group (LAG) port comprising a first plurality of network interfaces, derive a first hash key using at least a portion of the first MAC frame, identify, using the first hash key, a first network interface of the network element, wherein the first plurality of network interfaces comprises the first network interface, and bridge, using the first network interface, the first MAC frame to a first service device of a pair of service devices directly connected to the network element.

Other aspects of the invention will be apparent from the following description and the appended claims.

DETAILED DESCRIPTION

Figure 1:
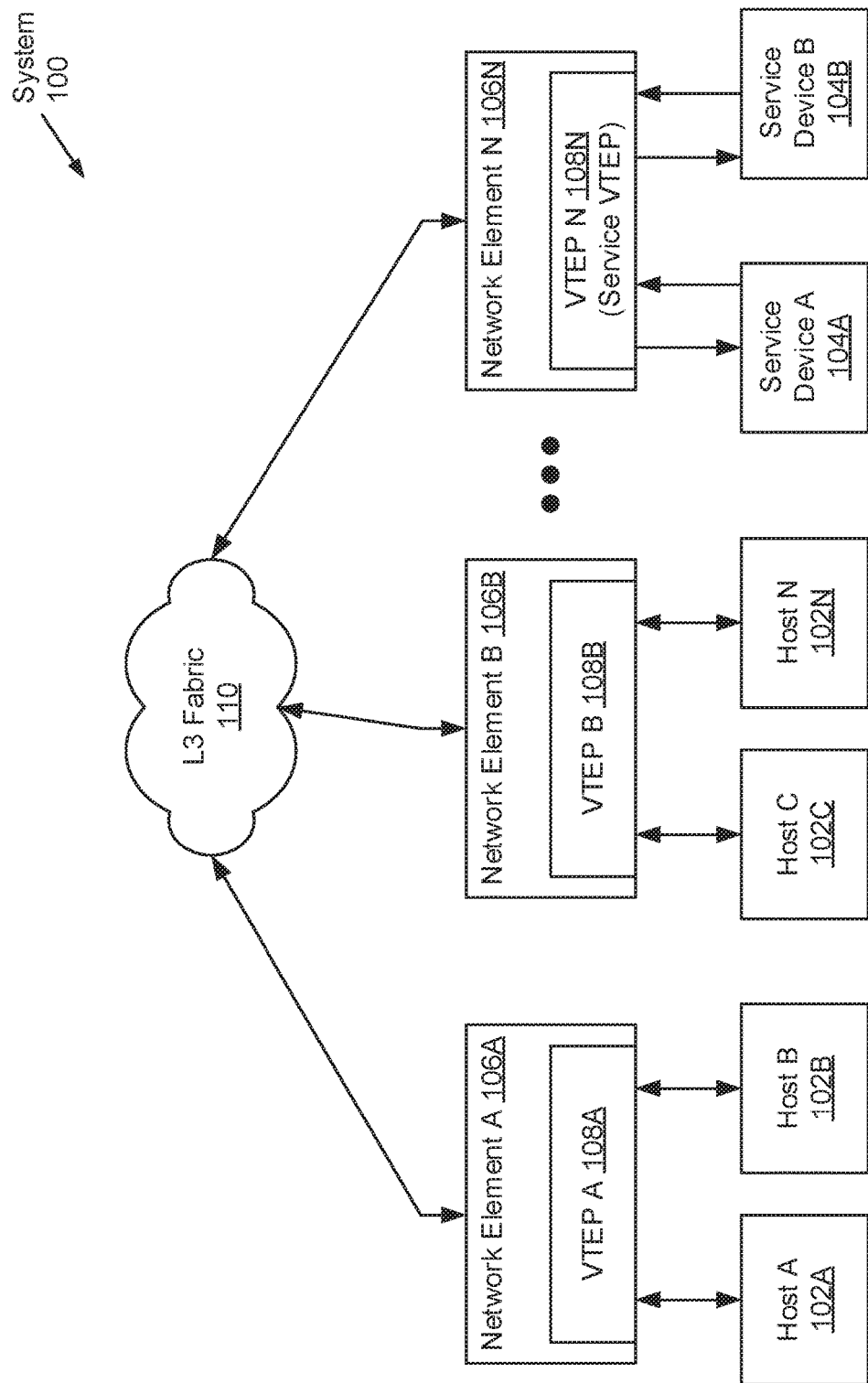
FIG. 1 shows a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-5B, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to a method and system for steering bidirectional network traffic to a same service device. Specifically, one or more embodiments of the invention entails the maintaining and synchronization of link aggregation group (LAG) tables tied to a pair of LAG ports instantiated on a network element directly connected to a pair of peer linking service devices. Network traffic (i.e., MAC frames) arriving at the network element, from a first host and intended for a second host (e.g., indicative of a first direction of the network traffic), may be steered towards one of the pair of service devices based on hashing of information included in a received MAC frame in conjunction with the LAG table tied to the LAG port (of the pair of LAG ports) that which received the MAC frame. More specifically, upon arriving at the network element, a forwarding decision is made based on at least a portion of the received MAC frame, whereby the received MAC frame is forwarded to one of the pair of LAG ports on the network element. While at the LAG port, a hashing function is executed which results in the selecting of a network interface (aggregated to form the LAG port) to which the received MAC frame is directed. Moreover, synchronization of the LAG tables may be essential when, arriving at the network element, from the second host and intended for the first host (e.g., indicative of a second direction of the network traffic), a MAC frame is steered to the one service device that handled/processed the first MAC frame received in associated with the first direction of the network traffic.

FIG. 1 shows a system in accordance with one or more embodiments of the invention. The system (100) includes one or more network element(s) (106A-106N) operatively connected to one another through a layer-3 (L3) fabric (110). The system (100) further includes one or more host(s) (102A-102N), which are directly connected to the one or more network element(s) (106A-106N). On each network element (106A-106N), a respective virtual tunnel end point (VTEP) (108A-108N) may be executing. Moreover, the system (100) includes at least one pair of service devices (104A, 104B), which is directly connected to at least one network element (e.g., 106N). Each of these components is described below.

In one embodiment of the invention, a network element (106A-106N) may be a physical device that includes persistent storage, memory (e.g., random access memory (RAM)), shared memory), one or more computer processor(s) (e.g., integrated circuits) (including a switch chip or network processor)), and two or more network interfaces or ports, which may be physical, virtual, or a combination thereof. The switch chip or network processor may be hardware that determines out of which egress port on the network element (106A-106N) to forward media access control (MAC) frames. The switch chip or network processor may include egress and ingress ports that may connect to the network interfaces or ports on the network element (106A-106N). Further, each network interface or port may or may not be connected to another component (e.g., a host (102A-102N), to another network element (106A-106N), to a service device (104A, 104B), or to the L3 fabric (110)) in the system (100). A network element (106A-106N) may be configured to receive network packets via the network interfaces or ports, and determine whether to: (i) drop the network packet; (ii) process the network packet in accordance with one or more embodiments of the invention; and/or (iii) send the network packet, based on the processing, out another network interface or port on the network element (106A-106N).

How the network element (106A-106N) makes the determination of whether to drop a network packet, and/or send a network packet to another component in the system (100) depends, in part, on whether the network element (106A-106N) is a L2 switch or a L3 switch (also referred to as a multilayer switch), which may perform at least some functions of a router. If the network element (106A-106N) is operating as a L2 switch, the network element (106A-106N) uses the destination MAC address along with a forwarding table or policy to determine out of which network interface or port to send the network packet. If the network element (106A-106N) is operating as a L3 switch, the network element (106A-106N) uses the destination Internet Protocol (IP) address along with a routing table or policy to determine out of which network interface or port to send the network packet, and includes the ability to write the MAC address of the next hop (or component) to receive the network packet in place of its own MAC address (which the last hop or component to send the network packet wrote) in the L2 information encapsulating the network packet. If the network element (106A-106N) is a multilayer switch, the network element (106A-106N) includes functionality to process network packets using both MAC addresses and IP addresses.

In one embodiment of the invention, the persistent storage on a network element (106A-106N) may include any type of non-transitory computer readable medium that includes instructions, which, when executed by the one or more computer processor(s), enable the network element (106A-106M) to perform any of the functionalities described herein. The persistent storage may further store: (i) the pair of link aggregation group (LAG) tables used in accordance with embodiments of the invention (discussed below); (ii) implementation details and/or computer readable program code for executing the hashing function used in accordance with embodiments of the invention (discussed below); and (iii) any other information pertinent to embodiments of the invention, which may or may not be explicitly disclosed herein. Moreover, examples of a network element (106A-106N) include, but are not limited to, a switch, a router, and a multilayer switch. A network element (106A-106N) is not limited to the aforementioned specific examples.

In one embodiment of the invention, a network element (106A-106N) may include a VTEP (108A-108N). A VTEP (108A-108N) may be an entity (e.g., software) which originates and/or terminates virtual layer-3 (VL3) tunnels. Further, a VTEP (108A-108N) may be capable of: (i) encapsulating a MAC frame, generated by or obtained from an operatively connected host (102A-102N), a virtual machine (VM) (not shown) executing on a host (102A-102N), another network element (106A-106N), a service device (104A, 104B), a container (not shown), and/or any other operatively connected physical or virtual device/entity; (ii) receiving a VL3 frame destined for an operatively connected host (102A-102N), virtual machine (not shown), and/or service device (104A, 104B) from a remote VTEP (108A-108N); and (iii) decapsulating (i.e., removing the VL3 frame header from) a received VL3 frame to obtain a MAC frame therein before delivering the MAC frame to an operatively connected host (102A-102N), virtual machine (not shown), and/or service device (104A, 104B). In one embodiment of the invention, a VL3 frame may be a virtual extensible local area network (VXLAN) frame, whereas the virtual tunnel through which VXLAN frames traverse may be a VXLAN tunnel. Embodiments of the invention are not limited to any specific implementation or protocol for generating/instantiating VL3 frames and/or virtual tunnels. Furthermore, in one embodiment of the invention, a service VTEP may be described herein. A service VTEP (e.g., VTEP N (108N)) may refer to a VTEP executing on a network element (e.g., network element M (106M)) that is directly connected to at least one service device (104A, 104N).

In one embodiment of the invention, a host (102A-102N) may be any type of system (e.g., software and computer hardware) that is configured to generate, send, receive, and/or process requests and replies either locally or over a network using software and computer hardware. A host (102A-102N) may include one or more processor(s), memory, and one or more network interface(s), which may be physical, virtual, or a combination thereof. Further, a host (102A-102N) may include functionality to generate, receive, and/or transmit MAC frames. Examples of a host (102A-102N) include, but are not limited to, a server (e.g., a database server, a dynamic host configuration protocol (DHCP) server, an application server, a file server, a print server, a mail server, or any other server), a desktop computer, a mobile device (e.g., a laptop computer, a smart phone, a personal digital assistant, a tablet computer, or any other mobile device), or any other type of computing device with the aforementioned minimum requirements.

In one embodiment of the invention, a service device (104A, 104B) may be a physical or virtual computing device that includes functionality to provide a service to network elements (106A-106N) and/or hosts (102A-102N) physically located at any position within the system (100). A service device (104A, 104B) may include at least one or more processor(s), memory, and two or more network interfaces, which may be physical, virtual, or a combination thereof. In one embodiment of the invention, a service device (104A, 104B) may include functionality to process network traffic, redirected to them, in accordance with the configuration of, and the specific service thus provided by, the service device (104A, 104B) to components of the system (100). Subsequently, a service device (104A, 104B) may include functionality to filter, mirror, store, forward, drop, transform, and/or perform any other action, or any combination thereof, to redirected network traffic, which is afforded by the configuration and provided service of the service device (104A, 104B). Examples of a service device (104A, 104B) include, but are not limited to, a network security device (e.g., a firewall device, a denial of service (DOS) attack scrubber), a network filtering device (e.g., a web content filter), a network data cache (e.g., a web-cache device), and a network load balancing device.

In one embodiment of the invention, the L3 fabric (110) may be a set of interconnected network elements or systems, which operatively connect the network elements (106A-106N) of the system (100) to one another. The L3 fabric (110) includes functionality to facilitate communications between these aforementioned components. The L3 fabric (110) may include any combination of local area network (LAN) and/or wide area network (WAN) segments, such as the Internet, which may employ any combination of wired and/or wireless connections and communication protocols.

While FIG. 1 shows a configuration of components, other system configurations may be used without departing from the scope of the invention. For example, the system (100) may further include one or more cloud service(s) (not shown), which may be operatively connected to the one or more network element(s) (106A-106N) through the L3 fabric (110).

In one embodiment of the invention, a cloud service (not shown) may be a platform for the centralized management of and/or consolidation of state information for all or a portion of the network elements (106A-106N) in the system (100). A cloud service may be implemented as one or more physical or virtual device(s), which includes at least one or more processor(s), memory, one or more network interface (s) and a data repository. In one embodiment of the invention, a cloud service includes executable instructions (stored in a non-transitory computer readable medium), which when executed, enable the cloud service to manage all or a portion of the one or more network element(s) (106A-106N) in the system (100).

In one embodiment of the invention, a cloud service may include a data repository. The data repository may be any type of storage unit and/or device (e.g., a file system, database, collection of tables, or any other storage medium) for storing data. Further, the data repository may include multiple different storage units and/or devices. The multiple storage units and/or devices may or may not be of the same type or located at the same physical site. The data repository may include functionality to store the aforementioned state information for all or a portion of the network elements (106A-106N) and the executable instructions. Other information may be stored in the data repository without departing from the scope of the invention.

Figure 2A:
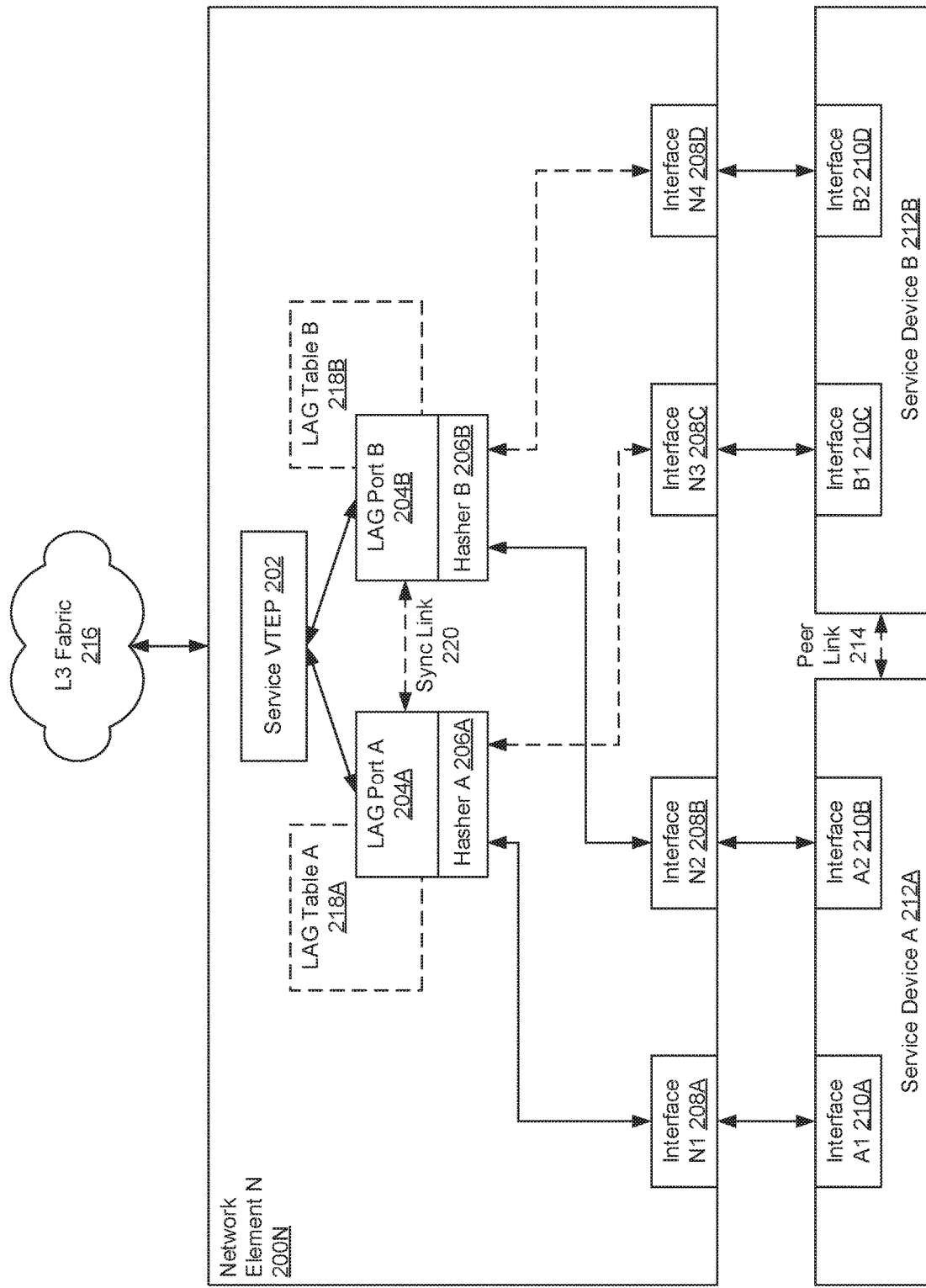
FIG. 2A shows a network element to service devices configuration in accordance with one or more embodiments of the invention.

FIG. 2A shows a network element to service devices configuration in accordance with one or more embodiments of the invention. The configuration includes a network element (200N) directly connected to a pair of service devices (212A, 212B) and operatively connected to a L3 fabric (216). The network element (200N) includes a service VTEP (202), a pair of link aggregation group (LAG) ports (204A, 204B), and several network interfaces (208A-208D), which may be physical, virtual, or a combination thereof. Further, each of the pair of service devices (212A, 212B) includes one or more network interfaces (210A-210B, 210C-210D), which may be physical, virtual, or a combination thereof. Each of these components is described below.

In one embodiment of the invention, a LAG port (204A, 204B) may be representative of a single logical network interface formed by an aggregation of multiple network interfaces (e.g., 208A-208D). In one embodiment of the invention, a LAG port (204A, 204B) may be bidirectional, whereas their constituent network interfaces (e.g., 208A-208D) may each be unidirectional or bidirectional. Each LAG port (204A, 204B) includes a hasher (206A, 206B). A hasher (206A, 206B) may be an entity (e.g., software) that includes the functionality of executing a hashing function. In one embodiment of the invention, the hashing function executed by each of the hashers (206A, 206B) is identical. Further, a hasher (206A, 206B) executes the hashing function, using a hash key, to obtain a bucket identifier (ID). The hash key may be an input for the hashing function and may be obtained through inspection of layer-2 (L2) and/or layer-3 (L3) header information included in media access control (MAC) or virtual L3 (VL3) frames, respectively. More specifically, the hash key may be generated using one or more known data field(s) of the aforementioned L2 and/or L3 header information. Examples of data fields that may be used to obtain a hash key include, but are not limited to, an inner source MAC address, an inner source Internet Protocol (IP) address, an inner destination MAC address, an inner destination IP address, an outer source MAC address, an outer source IP address, an outer destination MAC address, an outer destination IP address, a virtual network identifier (VNI), a virtual local area network (VLAN) tag, etc. In one embodiment of the invention, the hash key, in addition or alternatively to the L2 and/or L3 header information, may be generated using other information such as, for example, layer-4 (L4) header information, payload data, MAC and/or VL3 frame metadata, or any combination thereof.

In one embodiment of the invention, each LAG port (204A, 204B) further includes a LAG table (218A, 218B). A LAG table (218A, 218B) may be a data repository for storing bucket ID to network interface mappings. As a data repository, a LAG table (218A, 218B) may take the form of any type of storage unit and/or device such as, for example, a file system, a database, a collection of tables, or any other storage medium or structure. In one embodiment of the invention, a LAG table (218A, 218B) may be include static mappings programmed during the initial configuration of the network element (200N) and/or dynamic mappings programmed in response to dynamic topological changes occurring in the surrounding network. Further, the LAG table (218A, 218B) may be used in conjunction with the hasher (206A, 206B) to ascertain through which member network interface (208A-208D) of a LAG port (204A, 204B) network traffic traverses to reach an appropriate service device (212A, 212B). For example, network traffic, received by the network element (200N) at LAG port B (204B), may be steered towards service device A (212A) in a scenario whereby: (i) first, a bucket ID is obtained based on the execution of the hashing function, by hasher B (206B), using a hash key derived from at least a portion of the network traffic; and (ii) second, interface N2 (208B) is identified as the network interface specified in LAG table B (218B) corresponding to the bucket ID obtained in (i).

In one embodiment of the invention, the pair of LAG ports (204A, 204B) may each include functionality to share state information with one another. The state information shared may include, but is not limited to, the one or more bucket ID to network interface mapping(s) stored in each respective LAG table (218A, 218B). The sharing of the mappings enable the pair of LAG ports (204A, 204B) to synchronize their respective LAG tables (218A, 218B), which may be critical towards ensuring that bidirectional network traffic is steered towards a same service device (212A, 212B) that maintains the state information necessary to process the bidirectional network traffic. Moreover, the aforementioned mappings, and other state information, may be exchanged/shared between the pair of LAG ports (204A, 204B) through a sync link (220).

In one embodiment of the invention, each network interface (208A-208D) of the network element (200N) may be directly connected to one of the network interfaces (210A-210B, 210C-210D) of one of the service devices (212A, 212B). From the perspective of their host (e.g., the network element (200N) or a service device (212A, 212B)), a network interface may be an egress network interface, or a network interface through which outbound network traffic exits the host. Alternatively, a network interface may be an ingress network interface, or a network interface through which inbound network traffic enters the host. Alternatively yet, a network interface may be both an ingress and egress network interface.

In one embodiment of the invention, a service device (212A, 212B) may cache state information associated with currently received network traffic (i.e., network traffic associated with a first exchange of information between hosts) to perform actions on subsequently received network traffic (i.e., network traffic associated with a second or any future exchanges of information between the hosts). For example, a service device (212A, 212B) may use the L2, L3, and/or L4 header information or payload data to verify that a TCP three-way handshake between hosts for negotiating the parameters of a network TCP socket connection has completed properly. A TCP three-way handshake typically encompasses bidirectional network traffic between hosts, including: (a) a synchronize (SYN) packet from a first host to a second host; (b) a synchronize-acknowledgement (SYN-ACK) packet from the second host to the first host; and (c) an acknowledgement (ACK) packet from the first host to the second host. In this example, state information obtained from network traffic associated with the first leg (i.e., the SYN stage) of handshaking process may be used to perform actions to network traffic associated with the second or third leg(s) (i.e., the SYN-ACK or ACK stage(s)) of the handshaking process. Likewise, state information cached from network traffic associated with the second leg (i.e., the SYN-ACK stage) of the handshaking process may be subsequently used to perform actions to network traffic associated with the third leg (i.e., the ACK stage) of the handshaking process. By way of another example, a firewall device, as a service device (212A, 212B), may cache IP fragments from past received/processed network traffic, and subsequently, piece together the payload data pertaining to currently received network traffic, thereby parsing the payload data in order to detect malicious content.

While FIG. 2A shows a configuration of components, other configurations may be used without departing from the scope of the invention. For example, the configuration may further include an additional network element (not shown), which may form a multi-chassis LAG (MLAG) peer pair alongside network element N (200N). In this extended configuration, the MLAG peers may include functionality to share state information with one another as well, and the connections between the MLAG peers and the service devices (212A, 212B) may be further convoluted (see e.g., FIG. 5B).

Figure 2B:
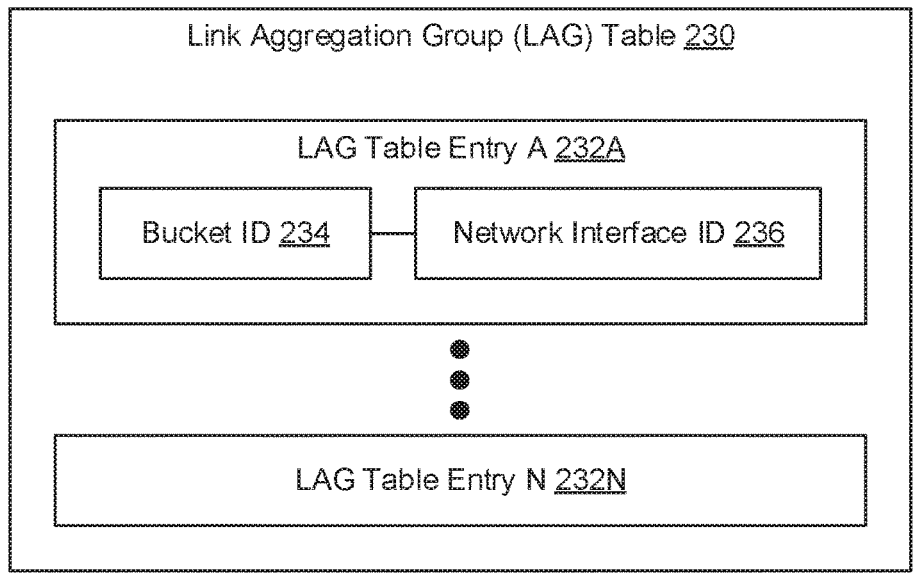
FIG. 2B shows a LAG table in accordance with one or more embodiments of the invention.

FIG. 2B shows a LAG table in accordance with one or more embodiments of the invention. A LAG table (230) may include one or more LAG table entries (232A-232N) (also referred to as an array of buckets). Each LAG table entry (232A-232N) or bucket, in turn, may include a bucket ID to network interface mapping. The mapping may be an association relating a specific bucket ID (234) to a specific network interface ID (236). The bucket ID (234) may be an index associated with the LAG table entry (232A-232N) or bucket in which the bucket ID is contained and references. The corresponding network interface ID (236) may be a unique identifier associated with one of the network interfaces aggregated as one of the LAG ports on a network element (see e.g., FIG. 2A) that is directly connected to at least a pair of service devices.

Figure 2C:
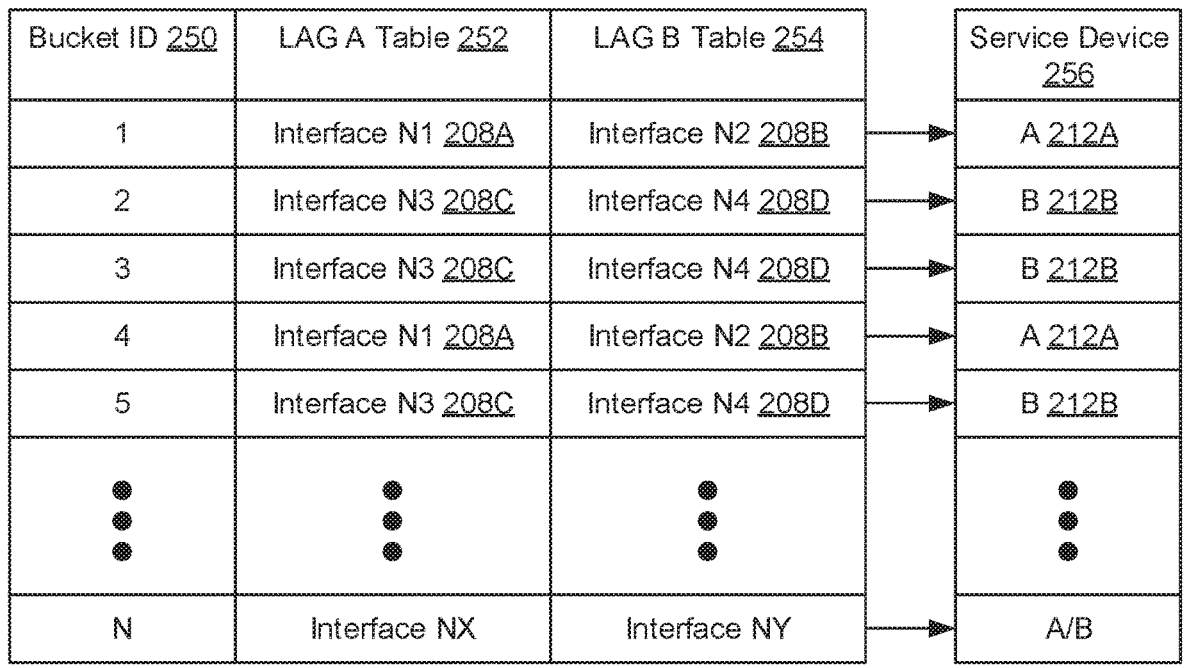
FIG. 2C shows example synchronized LAG tables in accordance with one or more embodiments of the invention.

FIG. 2C shows example synchronized LAG tables in accordance with one or more embodiments of the invention. Specifically, FIG. 2C portrays several example bucket ID to network interface mappings (in the form of each row of entries) based from the connections configuration illustrated in FIG. 2A. More specifically, four columns of information are shown: (i) the first column includes multiple entries pertaining to bucket IDs (250); (ii) the second column includes multiple entries pertaining to network interfaces that may be listed in a LAG A table (252) associated with LAG port A in FIG. 2A; (iii) the third column includes multiple entries pertaining to network interfaces that may be listed in a LAG B table (254) associated with LAG port B in FIG. 2A; and (iv) the fourth column includes multiple entries pertaining to the service devices (256) that may be reached through the network interfaces specified in the corresponding entries of the LAG A and LAG B tables (252, 254).

In one embodiment of the invention, and by way of an example, a first bucket ID (i.e., the first entry in the bucket ID column (250)) may be stored in the LAG A table (252) as corresponding to network interface N1 (208A, FIG. 2A), whereas within the LAG B table (254), the first bucket ID may correspond to network interface N2 (208B, FIG. 2A), of the network element (200N, FIG. 2A). Referring back to FIG. 2A and in tracing the paths from either LAG port A (204A, FIG. 2A) to network interface N1 (208A) or LAG port B (204B, FIG. 2A) to network interface N2 (208B), it is deduced that both of the aforementioned network interfaces (208A, 208B) couple to a network interface A1 (210A) or A2 (210B), respectively, of service device A (212A, FIG. 2A). Subsequently, a first service device specified in the first entry in the service device column (256) lists service device A (212A) as the service device mapped to network interfaces N1 (208A) and N2 (208B) under the LAG A table and LAG B table columns (252, 254), respectively, for the first bucket ID under the bucket ID column (250).

In one embodiment of the invention, and as mentioned above, the bucket ID to network interface mappings in a LAG table may be: (i) static mappings programmed during the initial configuration of the network element on which the LAG table is stored; and (ii) dynamic mappings programmed in response to dynamic changes occurring throughout the surrounding network after the initial configuration of the network element. With respect to the latter type of mappings, dynamic programming may refer to the generation, updating, and/or deletion of existing LAG table entries (i.e., mappings) in response to, for example, the failover of a specific network interface on the network element, the failover of a specific network interface on a service device, the failover of a service device in its entirety, the re-initialization of a failed service device, the migration of a service device to another set of network interfaces on the network element that are different from an initial set that were used to couple to the service device, the introduction of a new service device to a network, etc.

FIGS. 3A-3E show flowcharts describing a method for bridging bidirectional network traffic to a same service device in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 3A-3E may be performed in parallel with any other steps shown in FIGS. 3A-4 without departing from the scope of the invention.

Figure 3A:
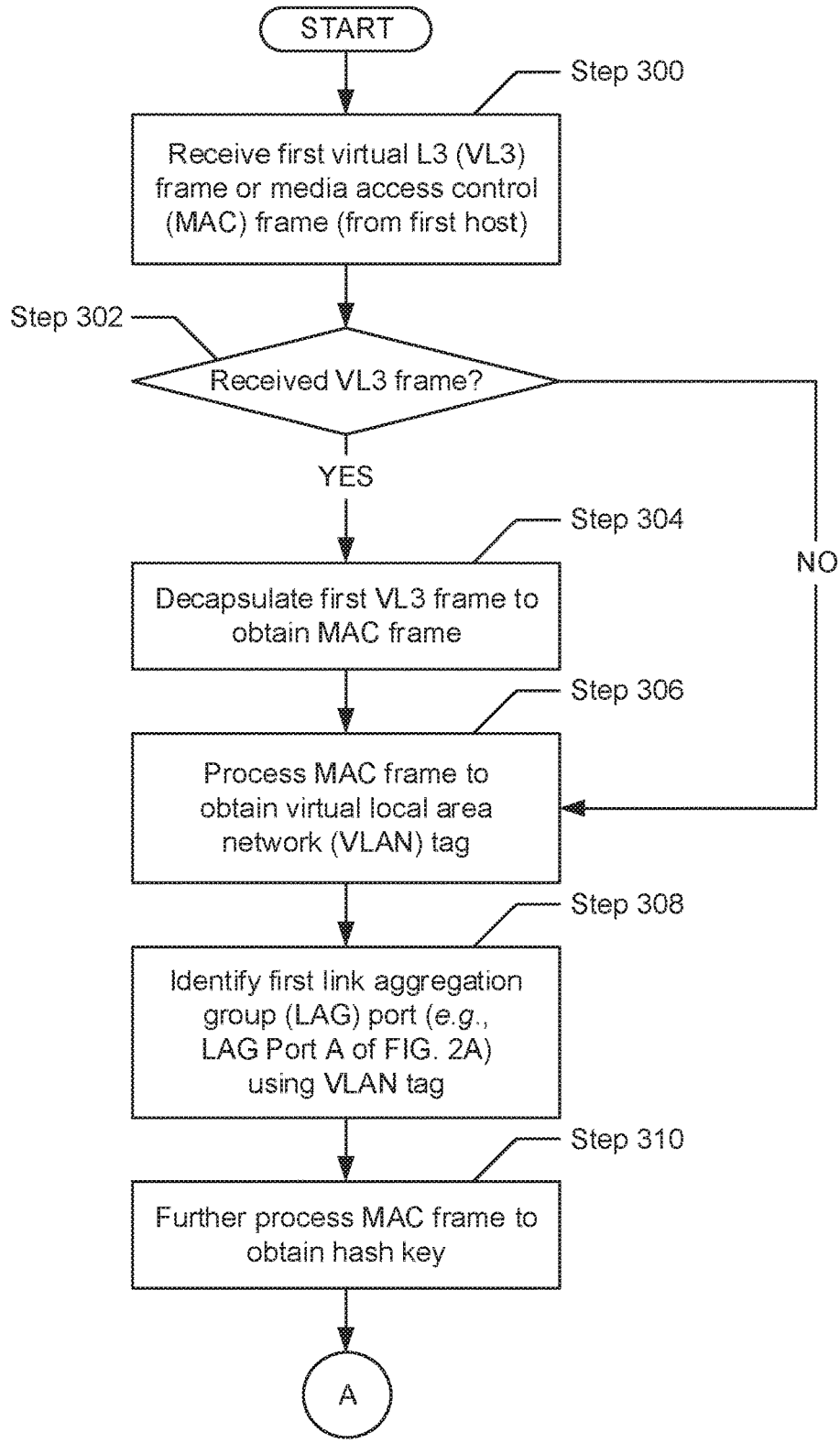
FIGS. 3A-3E show flowcharts describing a method for bridging bidirectional network traffic to a same service device in accordance with one or more embodiments of the invention.

Turning to FIG. 3A, in Step 300, and in one embodiment of the invention, a first virtual L3 (VL3) frame is received. The received VL3 frame may be representative of, for example, a virtual extensible local area network (VXLAN) frame. In such an embodiment, the first VL3 frame may have been transmitted to the network element (e.g., FIG. 2A, 200N) and/or service VTEP (e.g., FIG. 2A, 202) executing on the network element by a remote VTEP executing on a remote network element directly connected to a first host. Alternatively, in Step 300, and in an alternative embodiment of the invention, a first MAC frame is received. In such an embodiment, the first MAC frame may have been transmitted to the network element and/or service VTEP by a first host directly connected to the network element. In one embodiment of the invention, the first host may be synonymous with a source host, or a host from where network traffic originates.

Embodiments of the invention are not limited to the VXLAN tunneling protocol. The VL3 frames referenced throughout this disclosure may alternatively be representative of encapsulated packets associated with other tunneling protocols. By way of an example, the VL3 frames may be associated with a multi-protocol label switching (MPLS) push operation, which enables the forwarding of traffic utilizing labels. By way of another example, the VL3 frames may be associated with the generic routing encapsulation (GRE) tunneling protocol. Embodiments of the invention may employ any other existing and/or future developed tunneling protocol.

In Step 302, a determination is made as to whether the network traffic received is a VL3 frame. In one embodiment of the invention, a determination may be ascertained by examining the header information included in the network traffic. Specifically, data fields distinct to L3 header information (e.g., a VNI) may be identified to determine that the received network traffic is a VL3 frame. Conversely, the lack of data fields distinct to L3 header information may be identified to determine that the received network traffic is a MAC frame. Subsequently, if it is determined that the received network traffic is a VL3 frame, the process proceeds to Step 304. On the other hand, if it is determined that the received network traffic is a MAC frame, the process proceeds to Step 306.

In Step 304, after determining (in Step 302) that the network traffic (received in Step 300) is a VL3 frame, the first VL3 frame is decapsulated. In one embodiment of the invention, decapsulation may refer to the removal of the L3 header information included in the first VL3 frame. Further, decapsulation of the first VL3 frame yields a MAC frame enclosed therein.

In Step 306, the MAC frame (either received from a directly connected first host in Step 300 or obtained through decapsulation of the first VL3 frame in Step 304) is processed. In one embodiment of the invention, the processing may entail examining the MAC frame and extracting a VLAN tag enclosed therein. The VLAN tag may be a unique identifier associated with a specific VLAN to which the MAC frame belongs. VLAN tags may be used by network elements to identify which network interfaces or ports through which the MAC frames shall be transmitted.

In Step 308, using at least the VLAN tag (obtained in Step 306), a first LAG port is identified (e.g., LAG Port A (204A) of FIG. 2A). In one embodiment of the invention, identification of the first LAG port may entail performing a lookup of a table storing VLAN tag to LAG port mappings and identifying a table entry specifying the obtained VLAN tag. The identified table entry may thus also specify a unique identifier corresponding to the first LAG port. In another embodiment of the invention, identification of the first LAG port may further require the destination MAC address specified in the L2 header information of the MAC frame. In such an embodiment, the destination MAC address may or may not be learned on the VLAN associated with the VLAN tag. Further, in the scenario whereby the destination MAC address is not learned by the VLAN, all ports associated with the VLAN (including the first LAG port) may be identified.

In Step 310, the MAC frame is further processed to obtain a hash key. In one embodiment of the invention, further processing of the MAC frame may entail examining and extracting one or more data fields of the L2 header information enclosed therein. In another embodiment of the invention, when a first VL3 frame is received rather than a first MAC frame (in Step 300), the further processing may additionally or alternatively entail examining and extracting of one or more data fields of the L3 header information enclosed in the first VL3 frame. Subsequently, in one embodiment of the invention, the hash key may be any transformation (e.g., concatenation, interleaving, transposition, or any other operation) of one or more data fields extracted from L2 and/or L3 header information. From here, the process proceeds to Step 320 (see e.g., FIG. 3B).

Figure 3B:
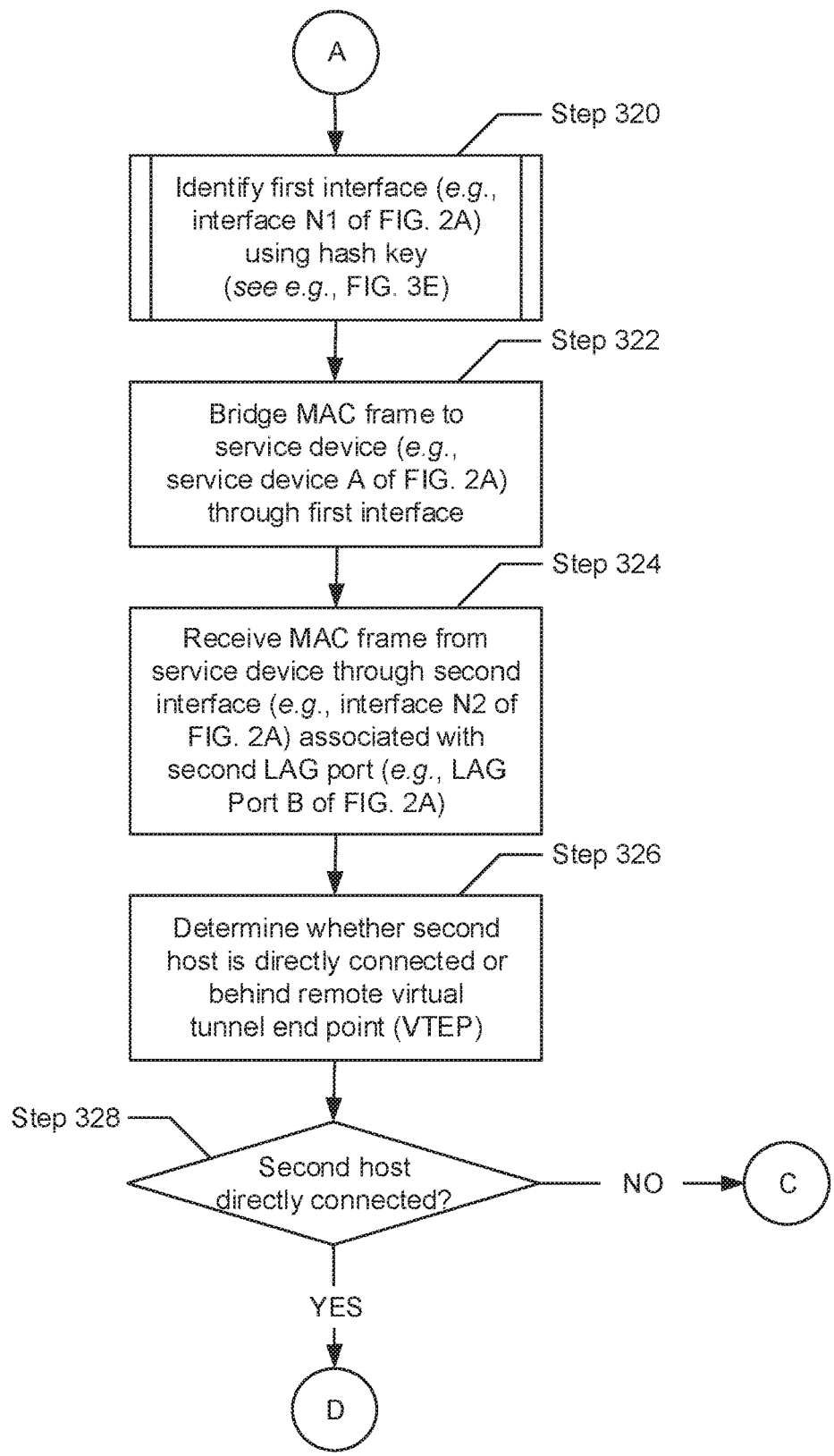

Turning to FIG. 3B, in Step 320, using the hash key (obtained in Step 310), a first network interface is identified (e.g., Interface N1 (208A) of FIG. 2A). In one embodiment of the invention, the first network interface may be one of a set of network interfaces aggregated to form the first LAG port. Identification of the first network interface is described in further detail below with respect to FIG. 3E.

In Step 322, the MAC frame is directed to the first network interface (identified in Step 320) and subsequently bridged. Specifically, in one embodiment of the invention, the MAC frame is bridged to a service device (e.g., Service Device A (212A) of FIG. 2A). The service device may be directly connected to the network element through at least the first network interface, wherein the first network interface may couple with a second network interface (e.g., Interface A1 (210A) of FIG. 2A) on the service device.

In Step 324, the MAC frame is received back from the service device. In one embodiment of the invention, the MAC frame may be received through a third network interface (on the network element) (e.g., Interface N2 (208B) of FIG. 2A). The third network interface may be one of a set of network interfaces aggregated to form a second LAG port (e.g., LAG Port B (204B) of FIG. 2A). The first device may further be directly connected to the network element through the third network interface, wherein the third network interface may couple with a fourth network interface (e.g., Interface A2 (210B) of FIG. 2A) on the service device.

In Step 326, a determination is made as to whether a second host is a directly connected host. In one embodiment of the invention, the second host may be synonymous with a destination host, or a host that is a designated destination for the network traffic. Further, a directly connected host may refer to a host that is directly connected (or attached) to the network element at which the network traffic was received in Step 300. Moreover, in one embodiment of the invention, a determination may be ascertained through a lookup of a forwarding information base (FIB) or MAC table, by the network element, using a destination MAC address enclosed in the MAC frame. A FIB or MAC table may be a data repository that stores MAC address to network interface mappings. If it is determined that the second host is a directly connected host (e.g., based on the lookup, a FIB entry is found specifying the destination MAC address), the process proceeds to Step 340B (see e.g., FIG. 3D). On the other hand, if it is determined that the second host is not a directly connected host (e.g., based on the lookup, a FIB entry is not found that specifies the destination MAC address), the process proceeds to Step 340A (see e.g., FIG. 3C).

Figure 3C:
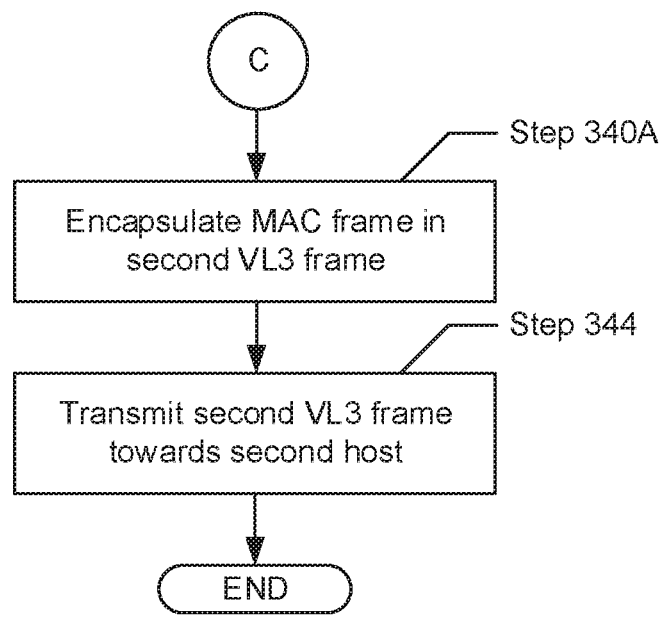

Turning to FIG. 3C, in Step 340A, after determining (in Step 326, FIG. 3B) that the second host is not a directly connected host, the MAC frame is encapsulated in a second VL3 frame. In one embodiment of the invention, encapsulation may refer to the appending of L3 header information to the MAC frame. In one embodiment of the invention, the second host not being a directly connected host may be indicative that the second host lies behind a remote network element and/or remote VTEP. In one embodiment of the invention, the determination (performed in Step 326), in order to ascertain that the second host lies behind a remote network element and/or VTEP, may entail identifying a table entry in a host MAC to destination IP table wherein the destination MAC address (for the second host) is specified. Furthermore, in one embodiment of the invention, encapsulation of the MAC frame in the second VL3 frame may be performed by the service VTEP executing on the network element.

In Step 344, following the encapsulation of the MAC frame (in Step 340A), the generated/obtained second VL3 frame is transmitted. Specifically, in one embodiment of the invention, the second VL3 frame is transmitted towards the second host by way of the remote network element and/or VTEP behind which the second host lies. At this point, the process ends.

Figure 3D:
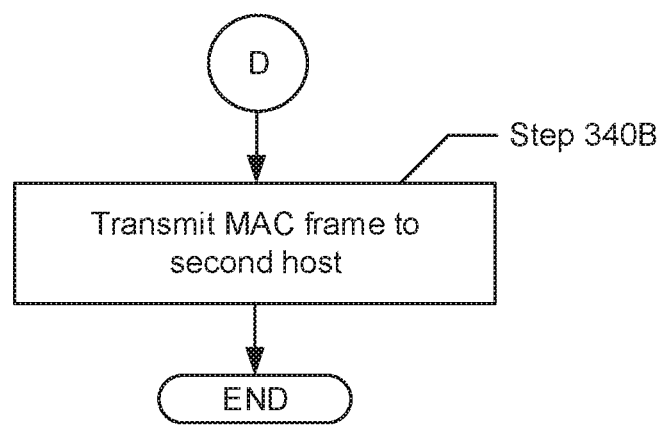

Turning to FIG. 3D, in Step 340B, after determining (in Step 326, FIG. 3B) that the second host is a directly connected host, the MAC frame is bridged. Specifically, in one embodiment of the invention, the MAC frame is bridged/transmitted to the second host, which as a directly connected host, lies behind the network element. At this point, the process ends.

Figure 3E:
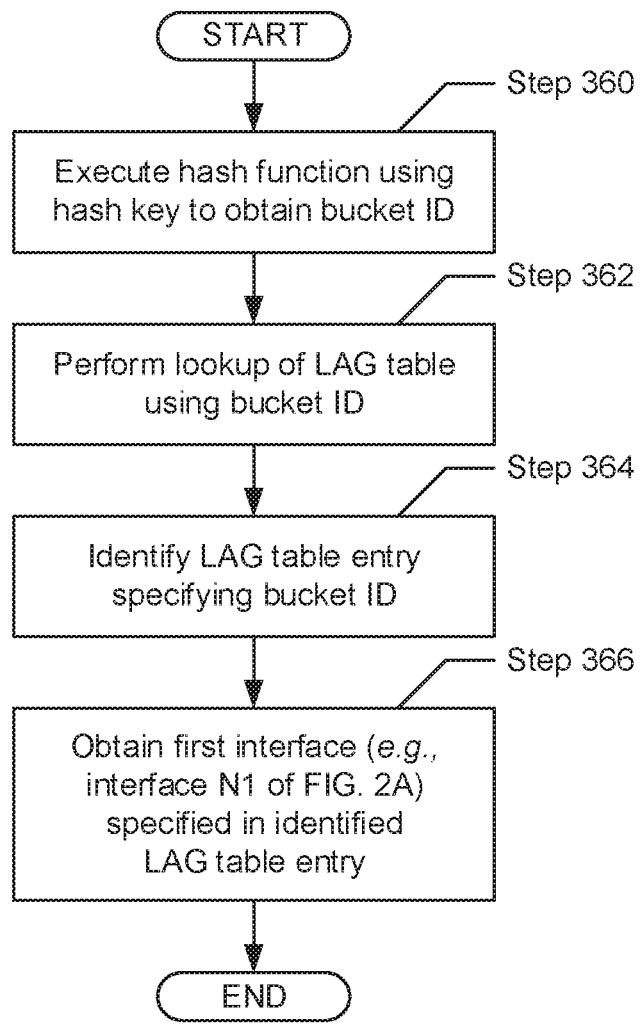

FIG. 3E further details the identification of the first network interface (mentioned in Step 320 of FIG. 3B) in accordance with one or more embodiments of the invention. Turning to FIG. 3E, in Step 360, using the hash key (obtained in Step 310 of FIG. 3A), a hash function is executed. In one embodiment of the invention, execution of the hash function in conjunction with the hash key results in the obtaining of a bucket ID. As described above, a bucket ID may be an index associated with a LAG table entry (see e.g., FIG. 2B) or bucket in which the bucket ID is contained and references. Furthermore, granted the hash function executed is the same for every instance, it may be the nature of the hash function to generate a same bucket ID for a same hash key inputted into the hash function during every instance.

In Step 362, using the bucket ID (obtained in Step 360), a lookup is performed of a LAG table. In one embodiment of the invention, the LAG table on which the lookup is performed may be associated with the LAG port tied to the hasher that executed the hash function (in Step 360). Further, in one embodiment of the invention, the lookup may entail comparing the bucket ID against the one or more bucket ID(s) specified in the one or more table entries of the LAG table.

In Step 364, based on the lookup (performed in Step 362), a LAG table entry is identified. Specifically, in one embodiment of the invention, the identified LAG table entry may specify or include the bucket ID (obtained in Step 360). In Step 366, after identifying the LAG table entry, the first network interface is obtained. In one embodiment of the invention, the first network interface may be the network interface also specified in the identified LAG table entry, which corresponds to the obtained bucket ID.

Figure 4:
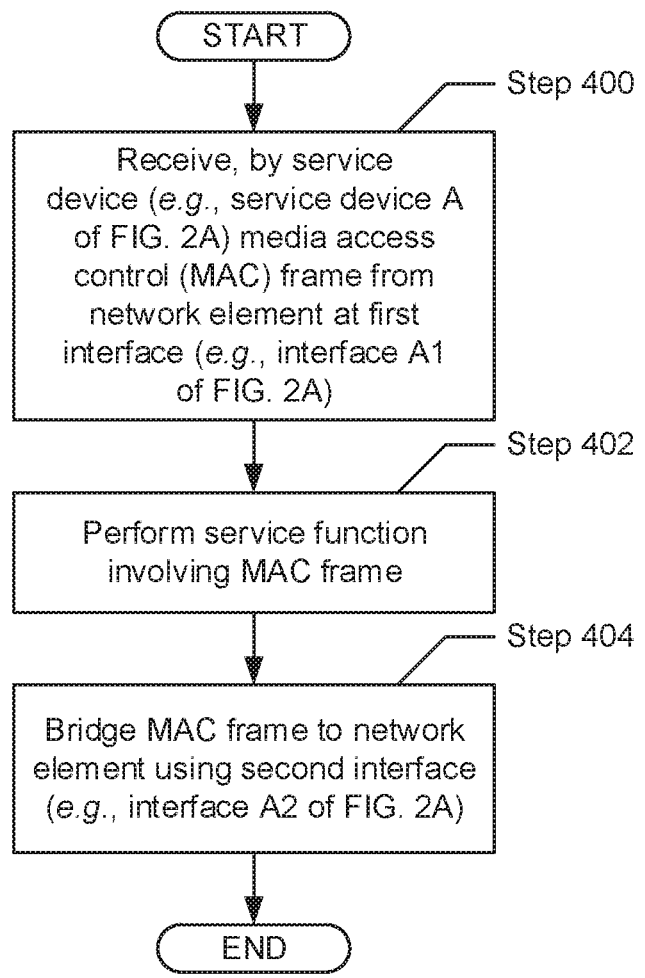
FIG. 4 shows a flowchart describing a method for handling bidirectional network traffic by service devices in accordance with one or more embodiments of the invention.

FIG. 4 shows a flowchart describing a method for handling bidirectional network traffic by service devices in accordance with one or more embodiments of the invention. While the various steps in the flowchart are presented and described sequentially, one of ordinary skill in the relevant art will appreciate that some or all of the steps may be executed in different orders, may be combined or omitted, and some or all steps may be executed in parallel. In one embodiment of the invention, the steps shown in FIG. 4 may be performed in parallel with any other steps shown in FIGS. 3A-4 without departing from the scope of the invention.

Turning to FIG. 4, in Step 400, a MAC frame is received by a service device (e.g., Service Device A (212A) of FIG. 2A). In one embodiment of the invention, the MAC frame may be received at a first (ingress) network interface (e.g., Interface A1 (210A) of FIG. 2A) on the service device. Further, prior to the receiving, the MAC frame may have been bridged over by a directly connected network element.

In Step 402, after receiving the MAC frame (in Step 400), one or more service function(s) are performed by the service device. In one embodiment of the invention, and as described above, a service function may be an action to which the network traffic (i.e., MAC frame) may be subjected based on one or more service policies or rules. By way of an example, the service function may include, but is not limited to, filtering, mirroring, storing, forwarding, dropping, and/or performing any other action involving (or pertinent to) the MAC frame.

In Step 404, after performing the one or more service function(s) (in Step 402) (and granted the MAC frame, based on the one or more service functions, is not dropped), the MAC frame is bridged back to the network element. In one embodiment of the invention, the MAC frame may first be directed to a second (egress) network interface (e.g., Interface A2 (210B) of FIG. 2A) on the service device prior to traversing the second network interface to the network element, wherein the second network interface may be coupled to a third (ingress) network interface (e.g., Interface N2 (208B) of FIG. 2A) on the network element.

Figure 5A:
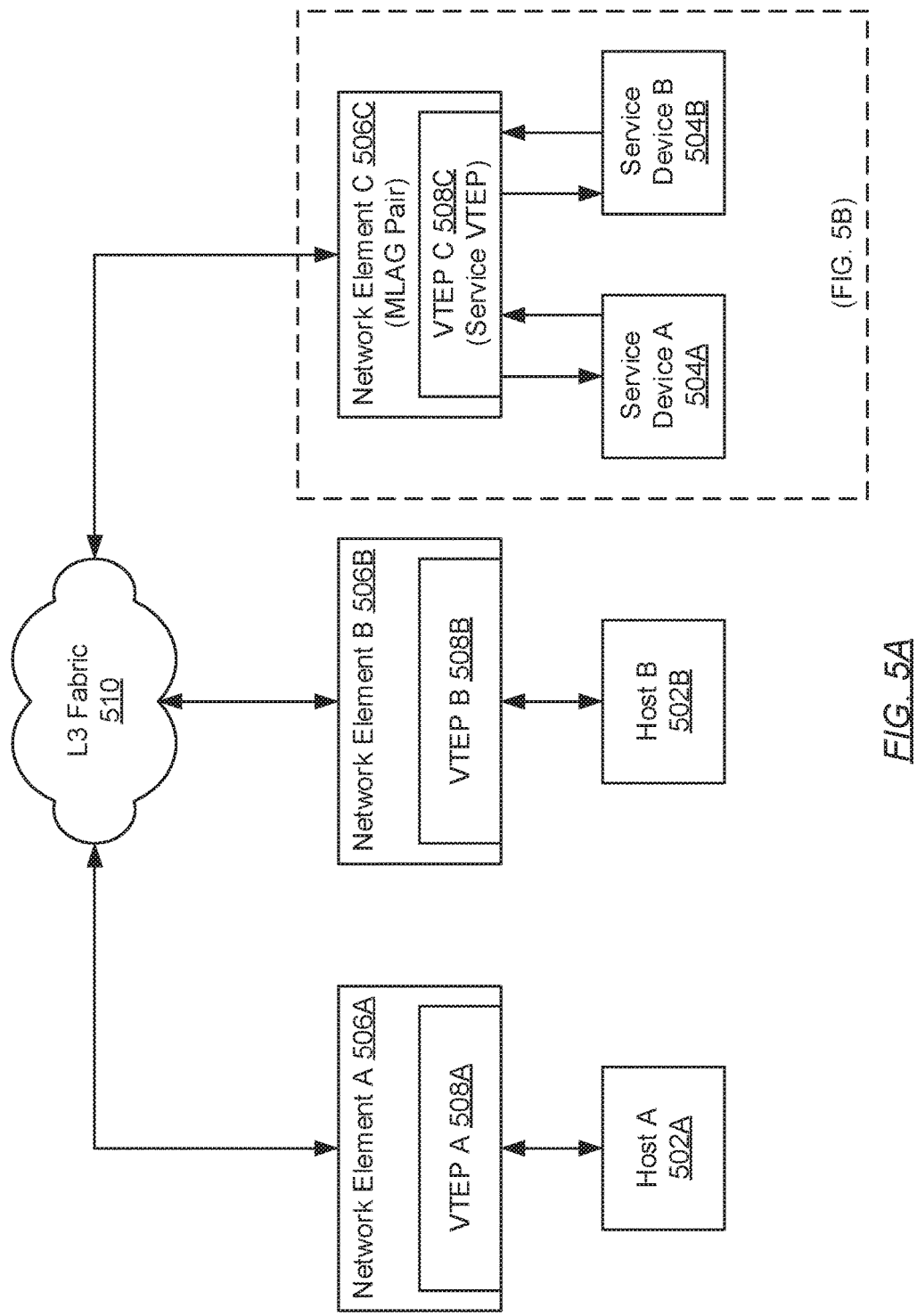
FIG. 5A shows an example system in accordance with one or more embodiments of the invention.

FIG. 5A shows an example system in accordance with one or more embodiments of the invention. The following example, presented in conjunction with components shown in FIGS. 5A and 5B, is for explanatory purposes only and not intended to limit the scope of the invention.

Turning to FIG. 5A, the example system (500) includes three network elements (506A-506C), which are operatively connected to one another through an L3 fabric (510). On each network element (506A-506C), there is a respective VTEP (508A-508C) executing thereon. Further, the example system (500) includes two hosts: (i) host A (502A), which is directly connected to network element A (506A); and (ii) host B (502B), which is directly connected to network element B (506B). Directly connected to network element C (506C), however, are a pair of service devices (504A, 504B). Because VTEP C (508C) is executing on a network element (506C) that is directly connected to at least one service device (504A, 504B), VTEP C (508C) is designated a service VTEP. Furthermore, in this example system (500), network element C (506C) is a logical network element formed by the multi-chassis link aggregation group (MLAG) pairing of two physical network elements (see e.g., FIG. 5B).

Figure 5B:
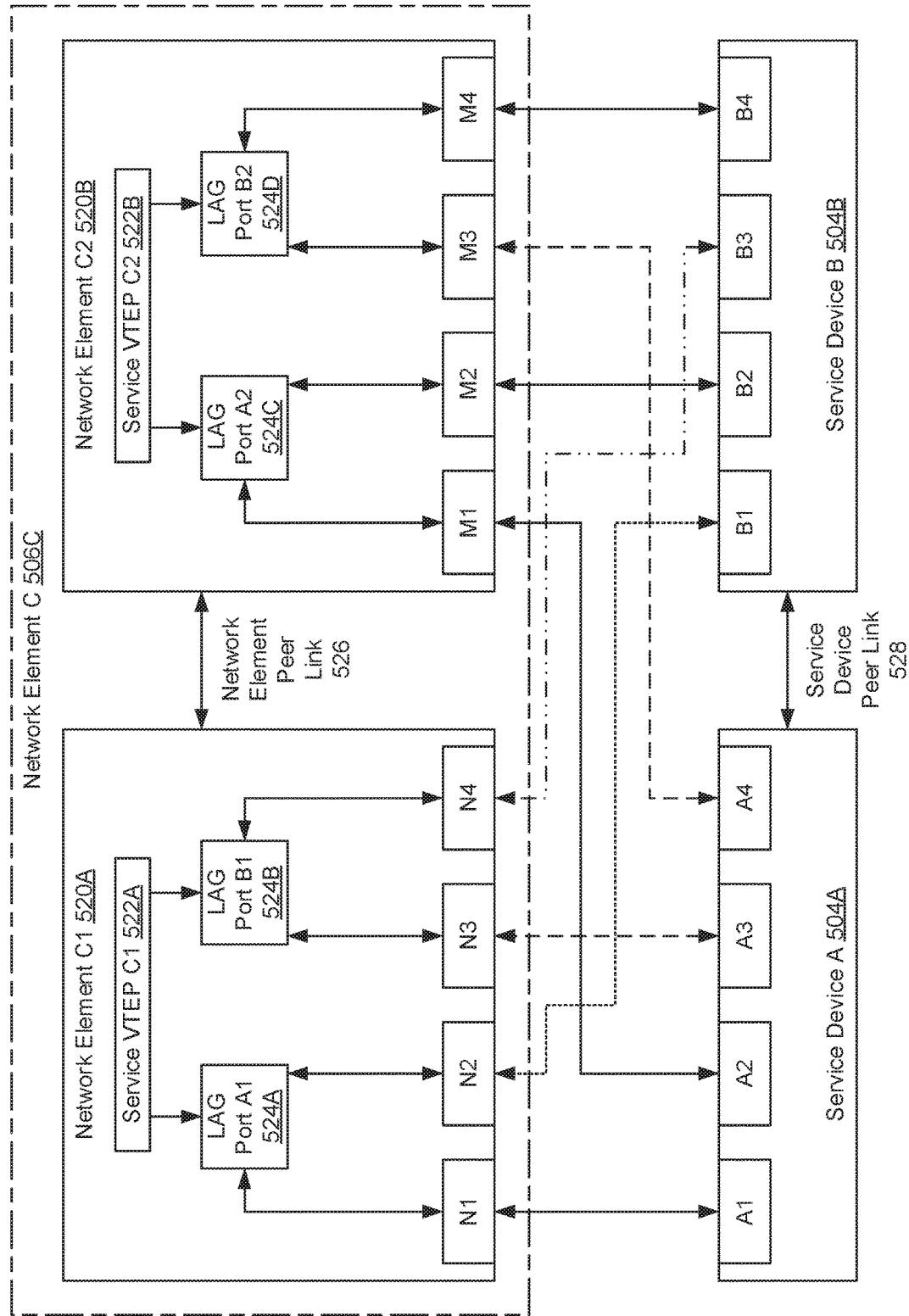
FIG. 5B shows an example network elements to service devices configuration in accordance with one or more embodiments of the invention.

To add further context to the following example, FIG. 5B shows an example network elements to service devices configuration in accordance with one or more embodiments of the invention. As mentioned above, network element C (506C) is a logical network element formed by the MLAG pairing of two physical network elements: network element C1 (520A) and network element C2 (520B). In one embodiment of the invention, each physical network element (520A, 520B) includes its own instances of a service VTEP (522A, 522B), a pair of LAG ports (524A-524D), and multiple network interfaces (e.g., N1-N4 and M1-M4). Though not explicitly shown, other components described herein, which may be included in a network element (e.g., a pair of hashers (206A, 206B, FIG. 2A), a pair of LAG tables (218A, 218B, FIG. 2A), and the sync link (220, FIG. 2A) between LAG ports) are assumed to be incorporated.

Further, in one embodiment of the invention, network element C1 (520A) and network element C2 (520B) may include functionality to share state information with one another. The state information shared may include all or a portion of each other's collective state information for maintaining redundant information across both network elements (520A, 520B). More specifically, the collective state information may include, but is not limited to, the mappings described herein stored in the respective pair of LAG tables, other tables or data repositories pertinent to the functionality of each respective network element (520A, 520B) (e.g., a forwarding information base (FIB), a routing information base (RIB), an address resolution protocol (ARP) table, etc.), historical and/or current configuration settings and computer readable program code respective to each network element (520A, 520B), one or more service policies or rules specifying redirect criteria (described below) for intercepting and redirecting network traffic towards the service devices (504A, 504B), etc. In one embodiment of the invention, the sharing of the aforementioned state information guarantees information redundancy, which may enable any one of the network elements (520A, 520B) to assume the responsibilities of the other (520A, 520B) during a failover event experienced by one of the network elements (520A, 520B). Moreover, the aforementioned state information may be exchanged/shared between the pair of network elements (520A, 520B) through a network element peer link (526). The network element peer link (526) may encompass, for example, a LAG peer link, a MLAG peer link, or any other peer link through which the aforementioned state information may be exchanged/shared.

In one embodiment of the invention, redirect criteria may include requirements (to be matched) in order to steer or redirect network traffic towards a service device. Redirect criteria may include, but are not limited to, matching requirements tied to: (i) a specific network element (i.e., a service policy may require that any network traffic originating from or destined to a specific network element must be redirected to service device for inspection first); (ii) a specific network interface on a network element (i.e., a service policy may require that any inbound and/or outbound network traffic traversing a specific network interface on a network element must be redirected to a service device for inspection first); (iii) a specific host or virtual machine (i.e., a service policy may require that any network traffic originating from or destined to a specific host or virtual machine must be redirected to a service device for inspection first); (iv) a specific source IP or MAC address and destination IP or MAC address pair (i.e., a service policy may require that any network traffic including a specific source IP/MAC address and a specific destination IP/MAC address must be redirected to a service device for inspection first); and (v) a specific virtual local area network (VLAN) and a specific IP/MAC address pair (i.e., a service policy may require that any network traffic including a specific VLAN tag (or VNI) and a specific IP/MAC address (associated with either a source or a destination) must be redirected to a service device for inspection first). Embodiments of the invention are not limited to the above-mentioned examples.

Returning to FIG. 5B, the portrayed configuration further shows the two service devices (504A, 504B) directly connected to logical network element C (506C). The pair of service devices (504A, 504B) include functionality to share state information (described above) using a service device peer link (528). The service device peer link (528) may encompass, for example, a LAG peer link, a MLAG peer link, or any other peer link through which the aforementioned state information may be exchanged/shared. Moreover, each service device (504A, 504B) includes four network interfaces (e.g., A1-A4 or B1-B4). The various network interfaces (e.g., N1-N4, M1-M4, A1-A4, and B1-B4) of the network elements (520A, 520B) and service devices (504A, 504B) are coupled to one another in such a manner as to reinforce the redundant nature of the MLAG pairing as well as to prevent the internal looping of network traffic within the network elements (520A, 520B).

The connections originating and ending at network element C1 (520A) via the service devices (504A, 504B), as portrayed in FIG. 5B, are summarized below in Table 1. Meanwhile, the connections originating and ending at network element C2 (520B) via the services devices (504A, 504B), as portrayed in FIG. 5B, are summarized below in Table 2. Further, the connections originating at network element C1 (520A), however, ending at network element C2 (520B) via the service devices (504A, 504B), as portrayed in FIG. 5B, are summarized below in Table 3. Lastly, the connections originating at network element C2 (520B), however, ending at network element C1 (520A) via the service devices (504A, 504B), as portrayed in FIG. 5B, are summarized below in Table 4. Moreover, each row in each table is representative of a path through which network traffic traverses starting at a LAG port (524A-524D) of a network element (520A, 520B) and ending at the other LAG port (524A-524D) of the same or another network element (520A, 520B). In one embodiment of the invention, in order to prevent internal looping of the network traffic, any given network traffic cannot return to the same LAG port (524A-524D) from which the network traffic egressed towards arriving at a service device (504A, 504B). Further, each column in each table is representative of a waypoint (e.g., a LAG port, an interface, etc.) along the path a given network traffic may traverse.

TABLE 1

Connections Originating & Ending at Network Element C1

| No. | Starting LAG Port | Egress NE C1 Interface | Ingress SD Interface | Egress SD Interface | Ingress NE C1 Interface | Ending LAG Port |
|---|---|---|---|---|---|---|
| 1 | A1 | N1 | A1 | A3 | N3 | B1 |
| 2 | A1 | N2 | B1 | B3 | N4 | B1 |
| 3 | B1 | N3 | A3 | A1 | N1 | A1 |
| 4 | B1 | N4 | B3 | B1 | N2 | A1 |

TABLE 2

Connections Originating & Ending at Network Element C2

| No. | Starting LAG Port | Egress NE C1 Interface | Ingress SD Interface | Egress SD Interface | Ingress NE C1 Interface | Ending LAG Port |
|---|---|---|---|---|---|---|
| 1 | A2 | M1 | A2 | A4 | M3 | B2 |
| 2 | A2 | M2 | B2 | B4 | M4 | B2 |
| 3 | B2 | M3 | A4 | A2 | M1 | A2 |
| 4 | B2 | M4 | B4 | B2 | M2 | A2 |

TABLE 3

Connections Originating at Network Element C1 & Ending at Network Element C2

| No. | Starting LAG Port | Egress NE C1 Interface | Ingress SD Interface | Egress SD Interface | Ingress NE C2 Interface | Ending LAG Port |
|---|---|---|---|---|---|---|
| 1 | A1 | N1 | A1 | A4 | M3 | B2 |
| 2 | A1 | N2 | B1 | B4 | M4 | B2 |
| 3 | B1 | N3 | A3 | A2 | M1 | A2 |
| 4 | B1 | N4 | B3 | B2 | M2 | A2 |

TABLE 4

Connections Originating at Network Element C2 & Ending at Network Element C1

| No. | Starting LAG Port | Egress NE C2 Interface | Ingress SD Interface | Egress SD Interface | Ingress NE C1 Interface | Ending LAG Port |
|---|---|---|---|---|---|---|
| 1 | A2 | M1 | A2 | A3 | N3 | B1 |
| 2 | A2 | M2 | B2 | B3 | N4 | B1 |
| 3 | B2 | M3 | A4 | A1 | N1 | A1 |
| 4 | B2 | M4 | B4 | B1 | N2 | A1 |

Example—Part 1

With regards to this first part of the example, consider a scenario whereby, in a first direction of network traffic, host A (502A) generates network traffic (i.e., a first MAC frame) that designates host B (502B) as the destination. Accordingly, the first MAC frame, after being generated by host A (502A), is bridged over to network element A (506A). Using at least a portion of the L2 header information enclosed in the first MAC frame in conjunction with redirect criteria specified in a service policy programmed thereon, service VTEP A (508A), executing on network element A (506A), determines that the first MAC frame needs to be intercepted and redirected towards a service device (504A, 504B). Based on the determination, VTEP A (508A) encapsulates the first MAC frame in a first VL3 frame and transmits the first VL3 frame towards VTEP C (508C) (i.e., the service VTEP) via a virtual tunnel originating at VTEP A (508A) and terminating at the service VTEP (508C).

Upon arriving at the logical service VTEP C (508C) executing on the logical network element C (506C), it is first decided at which physical network element (520A, 520B) the first VL3 frame will be received. This determination may be ascertained based on, for example, a hashing function, a lookup table, or any other mechanism that may use at least a portion of the first VL3 frame to select one of the physical network elements (520A, 520B) to which the first VL3 frame is subsequently directed. At this point, assume that network element C1 (520A) is selected to receive the first VL3 frame. Upon arriving at network element C1 (520A), service VTEP C1 (522A) decapsulates the first VL3 frame to obtain the first MAC frame enclosed therein. Next, service VTEP C1 (522A) examines the first MAC frame to obtain the VLAN tag enclosed therein. The VLAN tag is used to identify a (i.e., one) LAG port of the pair of LAG ports (524A, 524B) to which the first MAC frame is to be directed. For this example, assume LAG port A1 (524A) is identified.

At LAG port A1 (524A), the first MAC frame is further examined to obtain a hash key. The hash key may include a transformation of one or more data fields included in the L2 header information, L3 header information, and/or the L4 header information of the first MAC frame and/or first VL3 frame. Afterwards, using the hash key, one of the network interfaces (e.g., N1, N4, N5, or N8) aggregated to form LAG port A1 (524A) is identified in conjunction with a lookup performed of a LAG table A1 (not shown) associated with LAG port A1 (524A). More specifically, a hash function is executed, with the hash key as an input, thereby resulting in the obtaining of a bucket ID. The bucket ID is then used to perform the aforementioned lookup of LAG table A1. Based on the lookup, a table entry in LAG table A is identified that specifies the obtained bucket ID and a corresponding network interface ID. The network interface ID pertains to one of the aforementioned network interfaces aggregated to form LAG port A1 (524A). For this example, assume network interface N1 is identified. Following the identification of network interface N1, the first MAC frame is bridged over to service device A (504A), which is coupled to network interface N1 (of network element C1 (520A)) through network interface A1 (of service device A (504A)).

Upon arriving at service device A (504A), the first MAC frame is subjected to one or more service function(s) (described above) performed by service device A (504A). The service function(s) at least permit the first MAC frame to continue towards its designated destination—host B (502B). After performing the service function(s), service device A (504A) bridges the first MAC frame back to network element C1 (520A). Service device A (504A) may determine to bridge the first MAC frame to network element C1 (520A) over network element C2 (520B) based on: (i) an unavailability (or failure) of network element C2 (520B); or (ii) an examination of at least a portion of the L2 header information enclosed in the first MAC frame, which identifies network element C1 (520A) as the handler of the first MAC frame. Service device A (504A) directs the first MAC frame to network interface A3 (on service device A (504A)) in order to bridge the first MAC frame to network interface N3 (of network element C1 (520A)).

Back at network element C1 (520A), the first MAC frame arrives at network interface N3 and is received by LAG port B1 (524B), which includes network interface N3 as one of its set of member network interfaces (e.g., N3 and N4). LAG port B1 (524B) subsequently forwards the first MAC frame to service VTEP C1 (522A). Service VTEP C1 (522A) then determines whether host B (502B)—the destination for the first MAC frame—is a directly connected host. Thereafter, service VTEP C1 (522A) determines that because host B (502B) lies behind network element B (506B), host B (502B) is not a directly connected host. Based on the determination, service VTEP C1 (522A) prepares the first MAC frame for transmission towards host B (502B). Specifically, using an association relating LAG ports to VLANs, service VTEP C1 (522A) first identifies a VLAN corresponding to LAG port B1 (524B)—the LAG port at which the first MAC frame was received from service device B (504B). Using the identified VLAN, service VTEP C1 (522A) proceeds to include a VLAN tag associating the first MAC frame with the identified VLAN, and further, encapsulates the first MAC frame in a second VL3 frame that includes a VNI corresponding to the identified VLAN. After generating/obtaining the second VL3 frame, service VTEP C1 (522A) transmits the second VL3 frame towards host B (502B). More specifically, service VTEP C1 (522A) instantiates a virtual tunnel originating at service VTEP C1 (522A) and terminating at VTEP B (508B), and subsequently, transmits the second VL3 frame through the virtual tunnel.

Upon arriving at VTEP B (508B), the second VL3 frame is decapsulated to obtain the first MAC frame enclosed therein. From here, VTEP B (508B) analyzes the first MAC frame (i.e., examines the L2 header information therein) to determine that the destination for the first MAC frame is host B (502B), which is directly connected to network element B (506B) on which VTEP B (508B) is executing. Based on this determination, VTEP B (508B) proceeds to bridge the first MAC frame to host B (502B).

Example—Part 2

With regards to this second part of the example, consider a scenario whereby, in a second direction (opposite of the first direction) of network traffic, host B (502B) generates network traffic (i.e., a second MAC frame) that designates host A (502A) as the destination. Accordingly, the second MAC frame, after being generated by host B (502B), is bridged over to network element B (506B). Using at least a portion of the L2 header information enclosed in the second MAC frame in conjunction with redirect criteria specified in a service policy programmed thereon, service VTEP B (508V), executing on network element V (506B), determines that the second MAC frame needs to be intercepted and redirected towards a service device (504A, 504B). Based on the determination, VTEP B (508B) encapsulates the second MAC frame in a third VL3 frame and transmits the third VL3 frame towards VTEP C (508C) (i.e., the service VTEP) via a virtual tunnel originating at VTEP B (508B) and terminating at the service VTEP (508C).

Upon arriving at the logical service VTEP C (508C) executing on the logical network element C (506C), it is first decided at which physical network element (520A, 520B) the third VL3 frame will be received. This determination may be ascertained based on, for example, a hashing function, a lookup table, or any other mechanism that may use at least a portion of the third VL3 frame to select one of the physical network elements (520A, 520B) to which the third VL3 frame is subsequently directed. At this point, assume that network element C2 (520B) is selected to receive the third VL3 frame. Upon arriving at network element C2 (520B), service VTEP C2 (522B) decapsulates the third VL3 frame to obtain the second MAC frame enclosed therein. Next, service VTEP C2 (522B) examines the second MAC frame to obtain the VLAN tag enclosed therein. The VLAN tag is used to identify a LAG port of the pair of LAG ports (524C, 524D) to which the second MAC frame is to be directed. For this example, assume LAG port B2 (524D) is identified. Based on a synchronization of LAG tables across the two network elements (520A, 520B), it is further determined that service device A (504A) had handled/processed the first MAC frame earlier and thus includes the state necessary to handle/process the second MAC frame. Subsequently, the second MAC frame is further examined to obtain a hash key. The hash key may include a transformation of one or more data fields included in the L2 header information, L3 header information, and/or L4 header information of the second MAC frame and/or third VL3 frame. The hash key obtained in this instance may be identical to the hash key obtained earlier at network element C1 (520A) during the processing of the first MAC frame. Afterwards, using the hash key, network physical interface M3 is identified in conjunction with a lookup performed of a LAG table B2 (not shown) associated with LAG port B2 (524D). More specifically, a hash function is executed, with the hash key as an input, thereby resulting in the obtaining of a bucket ID. The bucket ID is then used to perform the aforementioned lookup of LAG table B2. Based on the lookup, a table entry in LAG table B2 is identified that specifies the obtained bucket ID and a corresponding network interface ID. The network interface ID pertains to network interface M3 (thus ensuring that the second MAC frame is directed to service device A (504A), which includes state necessary to handle/process the second MAC frame). Following the identification of network interface M3, the second MAC frame is bridged over to service device A (504A), which is coupled to network interface M3 (of network element C2 (520B)) through network interface A4 (of service device A (504A)).

At service device A (504A), the second MAC frame is subjected to one or more service function(s) (described above) performed by service device A (504A). The service function(s) at least permit the second MAC frame to continue towards its designated destination—host A (502A). After performing the service function(s), service device A (504A) bridges the second MAC frame back to network element C2 (520B). Service device A (504A) may determine to bridge the second MAC frame to network element C2 (520B) over network element C1 (520A) based on: (i) an unavailability (or failure) of network element C1 (520A); or (ii) an examination of at least a portion of the L2 header information enclosed in the second MAC frame, which identifies network element C2 (520B) as the handler of the second MAC frame. Service device A (504A) directs the second MAC frame to network interface A2 (on service device A (504A)) in order to bridge the second MAC frame to network interface M1 (of network element C2 (520B)).

Back at network element C2 (520B), the second MAC frame arrives at network interface M1 and is received by LAG port A2 (524C), which includes network interface M1 as one of its set of member network interfaces (e.g., M1 and M2). LAG port A2 (524A) subsequently forwards the second MAC frame to service VTEP C2 (522B). Service VTEP C2 (522B) then determines whether host A (502A)—the destination for the second MAC frame—is a directly connected host. Thereafter, service VTEP C2 (522B) determines that because host A (502A) lies behind network element A (506A), host A (502A) is not a directly connected host. Based on the determination, service VTEP C2 (522B) prepares the second MAC frame for transmission towards host A (502A). Specifically, using an association relating LAG ports to VLANs, service VTEP C2 (522B) first identifies a VLAN corresponding to LAG port A2 (524C)—the LAG port at which the second MAC frame was received from service device A (504A). Using the identified VLAN, service VTEP C2 (522B) proceeds to include a VLAN tag associating the second MAC frame with the identified VLAN, and further, encapsulates the second MAC frame in a fourth VL3 frame that includes a VNI corresponding to the identified VLAN. After generating/obtaining the fourth VL3 frame, service VTEP C2 (522B) transmits the fourth VL3 frame towards host A (502A). More specifically, service VTEP C2 (522B) instantiates a virtual tunnel originating at service VTEP C2 (522B) and terminating at VTEP A (508A), and subsequently, transmits the fourth VL3 frame through the virtual tunnel.

Upon arriving at VTEP A (508A), the fourth VL3 frame is decapsulated to obtain the second MAC frame enclosed therein. From here, VTEP A (508A) analyzes the second MAC frame (i.e., examines the L2 header information therein) to determine that the destination for the second MAC frame is host A (502A), which is directly connected to network element A (506A) on which VTEP A (508A) is executing. Based on this determination, VTEP A (508A) proceeds to bridge the second MAC frame to host A (502A).

Embodiments of the invention provide a mechanism for steering bidirectional network traffic to a same service device. To that effect, one or more embodiments of the invention are advantageous over existing methods and/or systems at least because embodiments of the invention circumvent additional communication between service devices. Specifically, in the absence of embodiments of the invention, a service device would need to query for state information from another service device, or share state information with another service device, in order to enable the service device (which had received the network traffic) to handle/process the network traffic. Without the necessity to query for, or share, state information, embodiments of the invention reduce computational time spent on the handling/processing of any given network traffic.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for handling media access control (MAC) frames, comprising:
   obtaining, by a network element, a first MAC frame originating from a first host and addressed to a second host;
   processing the first MAC frame to obtain a first virtual local area network (VLAN) tag;
   identifying, using the first VLAN tag, a first link aggregation group (LAG) port comprising a first plurality of network interfaces;
   deriving a first hash key using at least a portion of the first MAC frame;
   identifying, using the first hash key, a first network interface of the network element, wherein the first plurality of network interfaces comprises the first network interface;
   bridging, using the first network interface, the first MAC frame to a first service device of a pair of service devices directly connected to the network element;
   obtaining a second MAC frame originating from the second host and addressed to the first host;
   deriving a second hash key using at least a portion of the second MAC frame, wherein the second hash key and the first hash key are identical;
   identifying, using the second hash key, a second network interface of the network element, wherein a second plurality of network interfaces of a second LAG port comprises the second network interface; and
   bridging, using the second network interface, the second MAC frame to the first service device.

2. The method of claim 1, wherein identifying the first network interface using the first hash key, comprises:
   executing a hash function, with the first hash key as an input, to obtain a bucket ID;
   performing, using the bucket ID, a lookup of a first LAG table associated with the first LAG port;
   identifying a first LAG table entry in the first LAG table that specifies the bucket ID; and
   obtaining the first network interface from, and also specified in, the first LAG table entry.

3. The method of claim 2, further comprising:
   synchronizing the first LAG table with a second LAG table associated with the second LAG port,
   wherein the synchronizing comprises:

identifying the second network interface included in the second plurality of network interfaces that couples to the first service device; and
updating a second LAG table entry in the second LAG table to include the second network interface, wherein the second LAG table entry already includes the bucket ID.

4. The method of claim 1, further comprising:
receiving, from the first service device and after the first service device performs a first service function involving the first MAC frame, the first MAC frame at a third network interface of the network element; and
transmitting the first MAC frame towards the second host, wherein the second plurality of network interfaces comprises the third network interface.

5. The method of claim 1, further comprising:
processing the second MAC frame to obtain a second VLAN tag; and
identifying the second LAG port using the second VLAN tag.

6. The method of claim 1, further comprising:
receiving, from the first service device and after the first service device performs a second service function involving the second MAC frame, the second MAC frame at a third network interface of the network element; and
transmitting the second MAC frame towards the first host, wherein the first plurality of network interfaces comprises the third network interface.

7. A system, comprising:
a network element operatively connected to a plurality of hosts, and comprising a processor and a first plurality of network interfaces; and
a pair of service devices directly connected to the network element,
wherein the processor is programmed to:
obtain a first media access control (MAC) frame originating from a first host and addressed to a second host of the plurality of hosts;
process the first MAC frame to obtain a first virtual local area network (VLAN) tag;
identify, using the first VLAN tag, a first link aggregation group (LAG) port comprising a second plurality of network interfaces, wherein the second plurality of network interfaces is a subset of the first plurality of network interfaces;
derive a first hash key using at least a portion of the first MAC frame;
identify, using the first hash key, a first network interface of the network element, wherein the second plurality of network interfaces comprises the first network interface;
bridge, using the first network interface, the first MAC frame to a first service device of the pair of service devices;
obtain a second MAC frame originating from the second host and addressed to the first host;
derive a second hash key using at least a portion of the second MAC frame, wherein the second hash key and the first hash key are identical;
identify, using the second hash key, a second network interface of the network element, wherein a third plurality of network interfaces of a second LAG port comprises the second network interface; and
bridge, using the second network interface, the second MAC frame to the first service device.

8. The system of claim 7, wherein to identify the first network interface using the first hash key, the processor is programmed to:
execute a hash function, with the first hash key as an input, to obtain a bucket ID;
perform, using the bucket ID, a lookup of a first LAG table associated with the first LAG port;
identify a first LAG table entry in the first LAG table that specifies the bucket ID; and
obtain the first network interface from, and also specified in, the first LAG table entry.

9. The system of claim 8, wherein the processor is further programmed to:
synchronize the first LAG table with a second LAG table associated with the second LAG port, wherein the third plurality of network interfaces is a subset of the first plurality of network interfaces that exclude the second plurality of network interfaces,
wherein to perform the synchronizing, the processor is programmed to:
identify the second network interface included in the third plurality of network interfaces that couples to the first service device; and
update a second LAG table entry in the second LAG table to include the second network interface, wherein the second LAG table entry already includes the bucket ID.

10. The system of claim 7, wherein the processor is further programmed to:
receive, from the first service device and after the first service device performs a first service function involving the first MAC frame, the first MAC frame at a third network interface of the network element; and
transmit the first MAC frame towards the second host of the plurality of hosts,
wherein the third plurality of network interfaces is a subset of the first plurality of network interfaces that exclude the second plurality of network interfaces,
wherein the third plurality of network interfaces comprises the third network interface.

11. The system of claim 7, wherein the processor is further programmed to:
process the second MAC frame to obtain a second VLAN tag; and
identify the second LAG port using the second VLAN tag.

12. The system of claim 7, wherein the processor is further programmed to:
receive, from the first service device and after the first service device performs a second service function involving the second MAC frame, the second MAC frame at a third network interface of the network element; and
transmit the second MAC frame towards the first host, wherein the second plurality of network interfaces comprises the third network interface.

13. The system of claim 7, wherein the network element is one selected from a group consisting of a switch, a router, and a multilayer switch.

14. The system of claim 7, wherein the network element is a member of a multi-chassis link aggregation (MLAG) pair.

15. A non-transitory computer readable medium (CRM) comprising computer readable program code, which when executed by a computer processor, enables the computer processor to:

obtain, by a network element, a first media access control (MAC) frame originating from a first host and addressed to a second host;

process the first MAC frame to obtain a first virtual local area network (VLAN) tag;

identify, using the first VLAN tag, a first link aggregation group (LAG) port comprising a first plurality of network interfaces;

derive a first hash key using at least a portion of the first MAC frame;

identify, using the first hash key, a first network interface of the network element, wherein the first plurality of network interfaces comprises the first network interface;

bridge, using the first network interface, the first MAC frame to a first service device of a pair of service devices directly connected to the network element;

obtain a second MAC frame originating from the second host and addressed to the first host;

derive a second hash key using at least a portion of the second MAC frame, wherein the second hash key and the first hash key are identical;

identify, using the second hash key, a second network interface of the network element, wherein a second plurality of network interfaces of a second LAG port comprises the second network interface; and bridge, using the second network interface, the second MAC frame to the first service device.

16. The non-transitory CRM of claim 15, wherein to identify the first network interface using the first hash key, the computer readable program code, when executed by the computer processor, enables the computer processor to:

execute a hash function, with the first hash key as an input, to obtain a bucket ID;

perform, using the bucket ID, a lookup of a first LAG table associated with the first LAG port;

identify a first LAG table entry in the first LAG table that specifies the bucket ID; and obtain the first network interface from, and also specified in, the first LAG table entry.

17. The non-transitory CRM of claim 16, further comprising additional computer readable program code, which when executed by the computer processor, further enables the computer processor to:

synchronize the first LAG table with a second LAG table associated with a second LAG port, wherein to perform the synchronizing, the additional computer readable program code, when executed by the computer processor, enables the computer processor to:

identify the second network interface included in the second plurality of network interfaces that couples to the first service device; and update a second LAG table entry in the second LAG table to include the second network interface, wherein the second LAG table entry already includes the bucket ID.

18. The non-transitory CRM of claim 15, further comprising additional computer readable program code, which when executed by the computer processor, further enables the computer processor to:

receive, from the first service device and after the first service device performs a first service function involving the first MAC frame, the first MAC frame at a third network interface of the network element; and transmit the first MAC frame towards the second host, wherein the second plurality of network interfaces comprises the third network interface.

19. The non-transitory CRM of claim 15, further comprising additional computer readable program code, which when executed by the computer processor, further enables the computer processor to:

process the second MAC frame to obtain a second VLAN tag; and identify the second LAG port using the second VLAN tag.

20. The non-transitory CRM of claim 15, further comprising additional computer readable program code, which when executed by the computer processor, further enables the computer processor to:

receive, from the first service device and after the first service device performs a second service function involving the second MAC frame, the second MAC frame at a third network interface of the network element; and transmit the second MAC frame towards the first host, wherein the first plurality of network interfaces comprises the third network interface.

* * * * *